(12) United States Patent
Nishihara et al.

(10) Patent No.: US 7,542,221 B2
(45) Date of Patent: Jun. 2, 2009

(54) LENS UNIT AND ELECTRONIC APPARATUS USING SAME

(75) Inventors: Kazunari Nishihara, Sakai (JP); Shigeo Furukawa, Moriguchi (JP); Toshinari Noda, Neyagawa (JP); Naoki Tatehata, Neyagawa (JP)

(73) Assignee: Panasonic Corporation, Osaka (JP)

( * ) Notice: Subject to any disclaimer, the term of this patent is extended or adjusted under 35 U.S.C. 154(b) by 11 days.

(21) Appl. No.: 11/017,882

(22) Filed: Dec. 22, 2004

(65) Prior Publication Data
US 2005/0200979 A1    Sep. 15, 2005

(30) Foreign Application Priority Data
Dec. 24, 2003    (JP)    ............... 2003-426810

(51) Int. Cl.
    *G02B 7/02*    (2006.01)
(52) U.S. Cl. ........................ 359/819; 359/811
(58) Field of Classification Search ................ 359/819, 359/811, 813, 821, 822, 823, 827, 830
    See application file for complete search history.

(56) References Cited
    U.S. PATENT DOCUMENTS
    4,326,789 A  *  4/1982  Aoyagi et al. ............... 396/298

| 5,483,383 | A  | * | 1/1996  | Uziie et al. ............... 359/819 |
| 5,687,029 | A  | * | 11/1997 | Omi et al. ................. 359/700 |
| 6,559,439 | B1 | * | 5/2003  | Tsuchida et al. ........... 250/239 |
| 6,594,204 | B1 | * | 7/2003  | Yamamoto et al. ....... 369/44.14 |
| 2002/0167605 | A1 |   | 11/2002 | Akimoto et al. |
| 2004/0105173 | A1 | * | 6/2004  | Yamaguchi et al. ......... 359/793 |

FOREIGN PATENT DOCUMENTS

JP    07-001602    *  6/1995
JP    2002-286987     10/2002

OTHER PUBLICATIONS

Patent Abstracts of Japan, vol. 2003, No. 04, Apr. 2, 2003, & JP 2002 350608 A (Konica Corp.), Dec. 4, 2002—Abstract.

* cited by examiner

*Primary Examiner*—Alicia M Harrington
*Assistant Examiner*—Brandi N Thomas
(74) *Attorney, Agent, or Firm*—Wenderoth, Lind & Ponack, L.L.P.

(57) ABSTRACT

A lens unit includes a first lens (2) and a second lens (3) housed in a holder (1) which may improve aberration. The first lens (2) is cylindrical having a top that functions as a lens (2a), and the second lens (3) is pressed into the cylindrical portion (2b) of the first lens (2) having a top in such a manner that the inner periphery of the cylindrical portion (2b) of the first lens (2) is pressed by the outer periphery of the second lens (3).

41 Claims, 4 Drawing Sheets

LENS UNIT AND ELECTRONIC APPARATUS USING SAME

TECHNICAL FIELD

The present invention relates to a lens unit having at least two lenses housed in a cylindrical holder, and an electronic apparatus using the same.

BACKGROUND ART

As a recent trend, a portable telephone is equipped with a lens unit, enhancing its function. Such a lens unit is improved in aberration by housing a plurality of combined lenses in a cylindrical holder. For example, a first lens having a top that functions as a lens is combined with a second lens, and housed in a cylindrical holder.

Conventionally, there has been a fear in this type of lens unit such that the cylindrical holder is axially deflected from the combined structure of the first lens and the second lens.

For example, the first lens and the second lens are combined and integrated, but the combined structure is disposed in spaced positional relation with the cylindrical holder. Therefore, the holder is axially deflected from the combined structure of the first lens and the second lens, and there arises a problem of lowering in aberration improving effect.

A prior technology related to this application is, for example, introduced in Japanese Patent Laid-Open Application No. 2002-286987.

BRIEF SUMMARY OF THE INVENTION

The present invention is intended to enhance the aberration improving effect of a lens unit.

In order to achieve the purpose, a lens unit of the present invention comprises a cylindrical holder, a first lens and a second lens housed in the holder, wherein the first lens is cylindrical having a top that functions as a lens, and the second lens is pressed into the cylinder of the first lens having a top in such manner that the inner periphery of the first lens cylinder is pressed outwardly of the circumference. Since the first lens and the second lens are integrated with the cylindrical holder, the lens aberration may be improved due to the combination of at least these two lenses.

Also, the lens unit of the present invention comprises a cylindrical holder, a first lens and a second lens housed in the cylindrical holder, wherein the first lens is cylindrical having a top made of resin that functions as a lens, and the second lens made of glass is pressed into the cylinder of the first lens having a top in such a manner that the inner periphery of the first lens cylinder is pressed outwardly of the circumference by the outer periphery of the second lens. Since the first lens and the second lens are integrated with the cylindrical holder, the lens aberration may be improved due to the combination of at least two lenses.

Also, since the first lens is made of resin and the second lens is made of glass, the second lens is harder than the first lens, and thereby, when the second lens is pressed into the cylinder of the first lens, the inner periphery of the first lens cylinder is deformed, making the job easier, and also the second lens pressed therein can be reliably held.

Further, the lens unit of the present invention comprises a cylindrical holder, a first lens and a second lens housed in the cylindrical holder, wherein the first lens is cylindrical having a top that functions as a lens, and the second lens is pressed into the cylinder of the first lens having a top in such manner that the inner periphery of the first lens cylinder is pressed outwardly of the circumference by the outer periphery of the second lens. Also, the cylinder portion of the first lens is higher in hardness than the holding portion of the holder. Since the first lens and the second lens are integrated with the cylindrical holder, the lens aberration may be improved due to the combination of at least these two lenses.

Also, since the cylinder portion of the first lens is higher in hardness than the holding portion of the holder, when the outer periphery of the first lens cylinder is pressed into the inner periphery of the holder and is resiliently held, the holding portion of the holder is easily deformed, making it possible to suppress the deformation of the first lens cylinder and the lens portion connecting thereto.

Further, the lens unit of the present invention is configured in that the inner periphery of the holder is provided with a cylindrical holding portion disposed at a predetermined distance from the inner periphery of the holder, and the outer periphery of the first lens cylinder is resiliently held by the inner periphery of the holding portion. Since the cylinder of the first lens is resiliently held by the holding portion of the holder, the first lens and the second lens can be held at a fixed position in the holder.

Also, the lens unit of the present invention is configured in that the holding portion of the holder is shaped so as to be resiliently increased in diameter, and also, the inner periphery of the holding portion is smaller in diameter than the outer periphery of the first lens cylinder. As the first lens cylinder is pressed into the holding portion of the holder, the first lens can be resiliently held at a fixed position in the holding portion of the holder.

Further, the lens unit of the present invention is configured in that the holder and the first lens are made of resin, and also, the holding portion of the holder is less in thickness than the cylindrical portion of the first lens. Since the holding portion of the holder is less in thickness than the cylindrical portion of the first lens, when the outer periphery of the first lens cylinder is pressed into the inner periphery of the holder and is resiliently held, the holding portion of the holder is easily deformed, making it possible to lessen the deformation of the first lens cylinder and the lens connecting thereto.

Also, the lens unit of the present invention comprises a first lens made of resin and a second lens made of glass. Because of this combination, the second lens is harder than the first lens. When the second lens is pressed into the cylindrical portion of the first lens, the inner periphery of the first lens cylinder is deformed, making the job easier, and the second lens pressed therein can be reliably held.

Further, the lens unit of the present invention is configured in that at least one of the inner surface of the holding portion of the holder and the outer periphery of the cylinder of the first lens is roughened. Since at least one of the inner surface of the holding portion of the holder and the outer periphery of the first lens cylinder is roughened, when the outer periphery of the first lens cylinder is pressed into the inner periphery of the holding portion of the holder, the inner periphery and the outer periphery bite into each other, and thereby, the first lens can be reliably held by the holding portion.

Also, the lens unit of the present invention is configured in that the cylinder of the first lens is higher in hardness than the holding portion of the holder. Since the cylinder of the first lens is higher in hardness than the holding portion of the holder, when the outer periphery of the first lens cylinder is pressed into the inner periphery of the holder and is resiliently held, the holding portion of the holder is easily deformed. Accordingly, it is possible to lessen the deformation of the first lens cylinder and the lens connecting thereto.

Further, the lens unit of the present invention is configured in that at least one of the inner surface of the holding portion of the holder and the outer periphery of the cylinder of the first lens is roughened. Since at least one of the inner surface of the holding portion of the holder and the outer periphery of the first lens cylinder is roughened, when the outer periphery of the first lens cylinder is pressed into the inner periphery of the holding portion of the holder, the inner periphery and the outer periphery bite into each other, and thereby, the first lens can be reliably held by the holding portion.

Also, the lens unit of the present invention comprises a first lens made of resin and a second lens made of glass. Because of this combination, the second lens is harder than the first lens, and when the second lens is pressed into the cylinder of the first lens, the inner periphery of the first lens cylinder is deformed, making the job easier, and the second lens pressed therein can be reliably held.

Further, the lens unit of the present invention is configured in that the second lens is harder than the first lens. Since the second lens is harder than the first lens, when the second lens is pressed into the cylinder of the first lens, the inner periphery of the first lens cylinder is deformed, making the job easier, and the second lens pressed therein can be reliably held.

Also, the lens unit of the present invention is configured in that the inner periphery of the first lens cylinder is in tight contact with the outer periphery of the second lens. In this configuration, the space between the first lens and the second lens can be substantially sealed up. Accordingly, it is possible to prevent the first lens made of resin from being deteriorated due to moisture in the air that might be otherwise intruded into the space.

Further, the lens unit of the present invention is configured in that a flange inwardly extending from the inner periphery of the holding portion of the holder is integrated with one end of the holding portion of the holder, and the lens portion of the first lens is inserted into the holding portion from one end of the holding portion of the holder. Also, a collar outwardly extended toward the inner periphery of the holder at a portion outside the holding portion of the first lens cylinder is abutted on the flange of the holding portion of the holder. When the first lens is inserted into the holding portion of the holder, the collar of the first lens is abutted on the flange of the holding portion of the holder, and thereby, the position of the first lens in the holder can be stabilized.

Also, the lens unit of the present invention is configured in that at one end of the inner periphery of the holder is disposed a cylindrical throttle member which presses the collar of the first lens against the flange of the holding portion. The cylindrical throttle member is fitted at one end of the inner periphery of the holder, and thereby, the collar of the first lens is abutted on the flange of the holding portion, enabling the positioning in the holder of the first lens.

Further, the lens unit of the present invention is configured in that the throttle member is provided with a pressing portion which presses the second lens into the cylinder of the first lens. With the throttle member fitted at one end of the inner periphery of the holder, positioning of the first lens in the holder and positioning of the second lens in the cylinder of the first lens can be easily performed.

Also, the lens unit of the present invention is configured in that the abutment of the inner periphery of the cylinder of the first lens and the outer periphery of the second lens is closer to the collar than the abutment of the flange and collar. When the second lens is pressed into the cylinder of the first lens, the outer periphery of the second lens comes in contact with the inner periphery of the first lens cylinder, deforming the first lens outwardly, then only the collar is widened outwardly, and thereby, the lens is easily deformed, improving the workability.

Further, the lens unit of the present invention is configured in that the inner periphery of the first lens cylinder is sloped so as to become smaller in diameter from the collar side toward the lens side. Since the inner periphery of the lens cylinder is given a slope so as to be smaller in diameter from the collar side toward the lens side, when the second lens is pressed into the cylinder of the first lens by the throttle member, it comes into contact with the slope, and the second lens can be installed at a fixed position.

Also, the lens unit of the present invention is configured in that the portion coming in contact with the pressing portion of the throttle member of the second lens is plane. Since the second lens portion coming in contact with the pressing portion of the throttle member is plane, when the second lens is pressed into the cylinder of the first lens by the throttle member, the second lens is subjected to a nearly uniform pressure over its entire periphery and is appropriately press-fitted therein.

Further, an electronic apparatus of the present invention comprises a main body case, a lens unit disposed in the main body case, and an image pickup element disposed in the main body case opposing to the lens unit. Also, the lens unit is disposed so that the lens side of the first lens is opposed to the image pickup element in the main body case. Proper image forming can be realized by the lens unit with the first lens and the second lens integrated.

Also, the electronic apparatus of the present invention is configured in that the throttle member surface of the lens unit is covered with a transparent cover. In this configuration, it is possible to eliminate such trouble that an excessive force is applied to the throttle member outside the main body case, causing the first lens to be excessively pushed and damaged by the throttle member.

Also, the electronic apparatus of the present invention is configured in that the lens unit is housed in the main body case, and the throttle member surface of the lens unit is not projected from the main body case surface. Since the throttle member of the lens unit is not protruded from the main body case, it is possible to prevent the first lens from being excessively pushed and damaged by the throttle member due to an excessive force applied from the main body case to the throttle member.

Also, an electronic apparatus of the present invention comprises a main body case, a lens unit disposed in the main body case, and an image pickup element disposed in the main body case opposing to the lens unit. The lens unit is disposed so that the lens side of the first lens is opposed to the image pickup element in the main body case, and proper image forming can be realized by the lens unit with the first lens and the second lens integrated.

Also, the electronic apparatus of the present invention is configured in that the throttle member surface of the lens unit is covered with a transparent cover. In this configuration, it is possible to eliminate such problem that an excessive force is applied to the throttle member outside the main body case, causing the first lens to be excessively pushed and damaged by the throttle member.

Also, the electronic apparatus of the present invention is configured in that the lens unit is housed in the main body case, and the throttle member surface of the lens unit is not protruded from the main body case surface. Since the throttle member of the lens unit is not protruded from the main body case, it is possible to eliminate such trouble that an excessive force is applied to the throttle member outside the main body case, causing the first lens to be excessively pushed and damaged by the throttle member.

Further, an electronic apparatus of the present invention comprises a main body case, a lens unit disposed in the main body case, and an image pickup element disposed in the main body case opposing to the lens unit. Also, the lens side of the lens unit is disposed so as to be opposed to the image pickup element in the main body case. Proper image forming can be realized by the lens unit with the first lens and the second lens integrated.

Also, the electronic apparatus of the present invention is configured in that the throttle member surface of the lens unit is covered with a transparent cover. In this configuration, it is possible to prevent such trouble that an excessive force is applied to the throttle member outside the main body case, causing the first lens to be excessively pushed and damaged by the throttle member.

Also, the electronic apparatus of the present invention is configured in that the lens unit is housed in the main body case, and the throttle member surface of the lens unit is not projected from the main body case surface. Since the throttle member of the lens unit is not protruded from the main body case, it is possible to prevent such trouble that an excessive force is applied from the main body case to the throttle member, causing the first lens to be excessively pushed and damaged by the throttle member.

DETAILED DESCRIPTION OF THE PREFERRED EMBODIMENT

Figure 1:
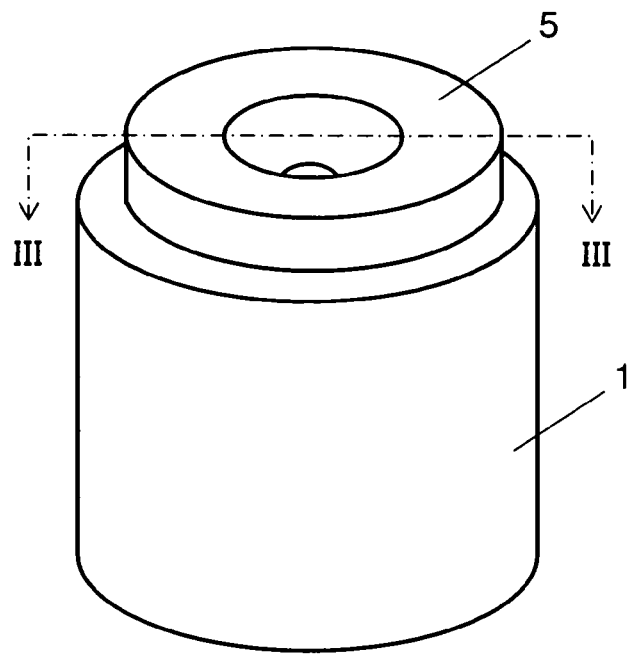
FIG. 1 is a perspective view of a lens unit in one preferred embodiment of the present invention.

One preferred embodiment of the present invention will be described in the following by using FIG. 1 to FIG. 3.

A lens unit in the present preferred embodiment comprises cylindrical holder 1, for example, made of resin such as polycarbonate, first lens 2, second lens 3, and third lens 4 which are housed in holder 1. First lens 2 is for example made of transparent resin, and its top is formed of lens portion 2a, which is cylindrical having a top. Cylindrical second lens 3 made of glass is pressed into cylinder 2b of cylindrical first lens 2 having a top in such manner that the inner periphery of cylinder 2b of first lens 2 is pressed outwardly of the circumference by the outer periphery of second lens 3.

Also, a cylindrical holding portion 1a is disposed at the inner periphery of holder 1 and is spaced a predetermined distance from the inner periphery of holder 1. The outer periphery of cylinder 2b of first lens 2 is resiliently held by the inner periphery of holding portion 1a.

That is, the cylinder of first lens 2 is resiliently held by holding portion 1a of holder 1, and thereby, the first lens 2 and second lens 3 are held at a fixed position in holder 1.

Holding portion 1a of holder 1 is resiliently diametrically expandable, that is, formed from a resilient material, and its diameter is free to increase and decrease. Also, the inner peripheral diameter of holding portion 1a is smaller than the outer peripheral diameter of cylinder 2b of first lens 2. Accordingly, in the straight view of FIG. 3, by pressing the cylinder 2b of first lens 2 into holding portion 1a of holder 1 from above, first lens 2 can be resiliently held at a fixed position in holding portion 1a of holder 1.

Figure 3:
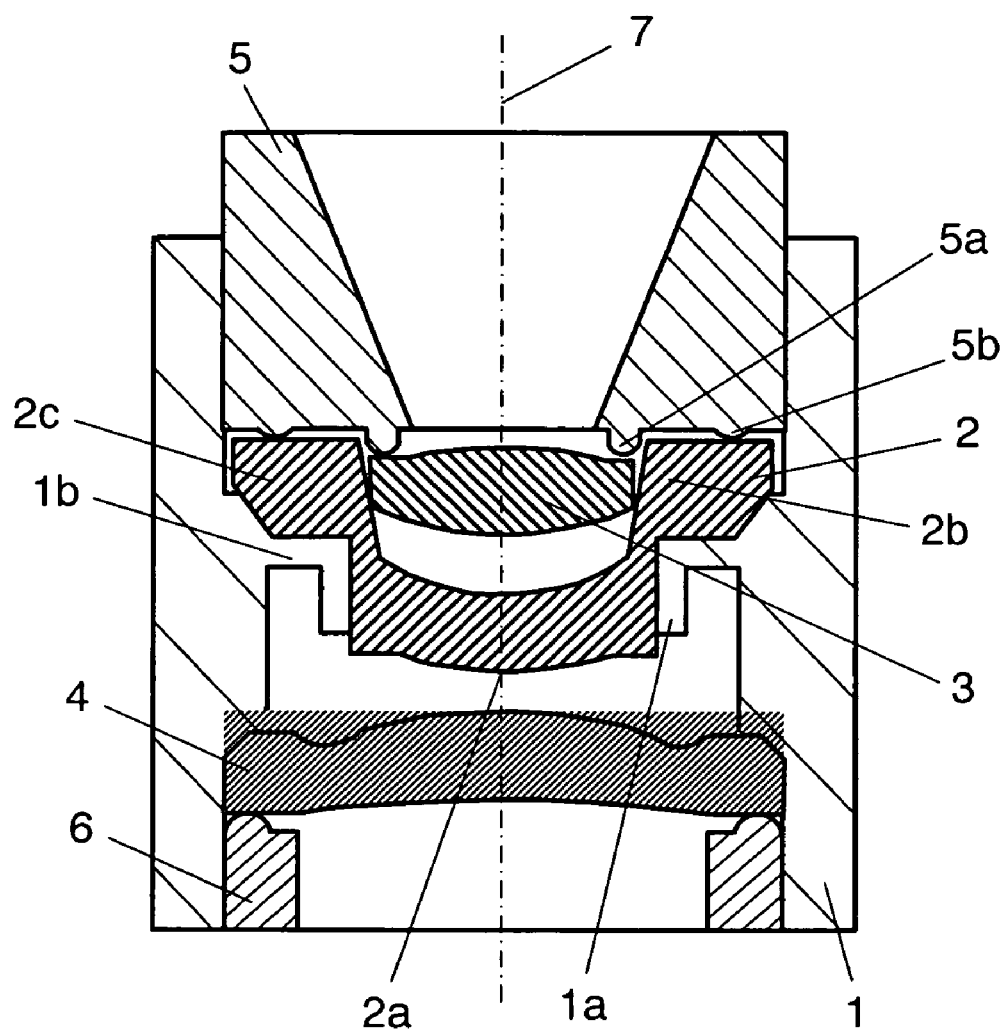
FIG. 3 is a sectional view along III-III line of FIG. 1.

Also, resin is used as the material for holder 1 and first lens 2, and holding portion 1a of holder 1 is less in thickness than cylinder 2b of first lens 2 as shown in FIG. 3.

That is, since holding portion 1a of holder 1 is less in thickness than cylinder 2b of first lens 2, when the outer periphery of cylinder 2b of first lens 2 is pressed into the inner periphery of holder 1 and is resiliently held, holding portion 1a of holder 1 is easily deformed. Accordingly, the deformation of cylinder 2b of first lens 2 and lens portion 2a connecting thereto can be lessened, and it is preferable as an optical characteristic.

Second lens 3 is an aspherical lens, and the second lens 3 is pressed into cylinder 2b of first lens 2 by throttle member 5.

That is, cylindrical throttle member 5 made of resin such as polycarbonate is provided with pressing portion 5a which presses second lens 3 into cylinder 2b of first lens 2 and pressing portion 5b which presses first lens 2 already installed.

Accordingly, by press-fitting the throttle member into one end of the inner periphery of holder 1, it is possible to easily perform the positioning of first lens 2 in holder 1 and the positioning of second lens 3 in cylinder 2b of first lens 2.

As to pressing the second lens 3 by throttle member 5, second lens 3 is made of glass and first lens 2 is made of resin, and this is one of the characteristics of the present invention.

That is, second lens 3 is made of glass, and first lens 2 is made of resin, and thereby, it is possible to make second lens 3 harder than first lens 2. When second lens 3 is pressed into cylinder 2b of first lens 2, the inner periphery of cylinder 2b of first lens 2 is deformed, making the job easier, and also, second lens 3 pressed therein can be reliably held.

Also, first lens 2 is made of resin, and second lens 3 is made of glass, making the lenses different in hardness and causing cylinder 2b of first lens 2 to be deformed, and thereby, the inner periphery of cylinder 2b of first lens 2 comes in tight contact with the outer periphery of second lens 3.

And, the inner periphery of cylinder 2b of first lens 2 is in tight contact with the outer periphery of second lens 3, and the space between first lens 2 and second lens 3 is substantially sealed up, and it is possible to prevent first lens 2 made of resin from being deteriorated due to moisture in the air that might otherwise intrude into the space.

Also, the following configuration is effective for making the inner periphery of cylinder 2b of first lens 2 come in tight contact with the outer periphery of second lens 3. That is, the inner periphery of cylinder 2b of first lens 2 is sloped so as to be decreased in diameter from collar 2c toward lens portion 2a.

In such a configuration, when second lens 3 is pressed into cylinder 2b of first lens 2 by throttle member 5, the second lens 3 can be disposed at a fixed position by abutting the sloped inner periphery of cylinder 2b of first lens 2.

The abutment of pressing portion 5a of throttle member 5 and second lens 3 is planar. And, in this way, since the portion of second lens 3 on which pressing portion 5a of throttle member 5 abuts is planar, when second lens 3 is pressed into cylinder 2b of first lens 2 by throttle member 5, the second lens 3 is subjected to nearly uniform pressure over its entire periphery, and thereby, proper press-fitting can be realized.

Here, holding portion 1a of holder 1 is described in detail.

At one end of holding portion 1a of holder 1 flange 1b is integrated and is inwardly extended from the inner periphery of holding portion 1a of holder 1. Lens portion 2a of first lens 2 is inserted into holding portion 1a from one end of holding portion 1a of holder 1, and collar 2c outwardly extended toward the inner periphery of holder 1 at a portion outside the holding portion of cylinder 2b of first lens 2 is abutted on flange 1b of holding portion 1a of holder 1.

In the above configuration, when first lens 2 is inserted into holding portion 1a of holder 1, collar 2c of first lens 2 is abutted on flange 1b of holding portion 1a of holder 1, and thereby, first lens 2 can be reliably held in holder 1.

At least one of the inner periphery of holding portion 1a of holder 1 and the outer periphery of cylinder 2b of first lens 2 being roughened, when the outer periphery of cylinder 2b of first lens 2 is pressed into the inner periphery of holding portion 1a of holder 1, the inner periphery and the outer periphery bite into each other, and thereby, first lens 2 is reliably held by holding portion 1a.

In the above configuration, the especially important point is that the abutment of the inner periphery of cylinder 2b of first lens 2 and the outer periphery of second lens 3 is closer to the collar 2c side than the abutment of flange 1b and collar 2c.

That is, when second lens 3 is pressed into cylinder 2b of first lens 2, the outer periphery of second lens 3 comes in contact with the inner periphery of cylinder 2b of first lens 2. Accordingly, when first lens 2 is deformed outwardly, only collar 2c is widened outwardly, and thereby, the lens is easily deformed, improving the workability.

Due to the above configuration, as shown in FIG. 3, the optical axis 7, first lens 2, second lens 3 and third lens 4 can be aligned in holder 1.

Figure 2:
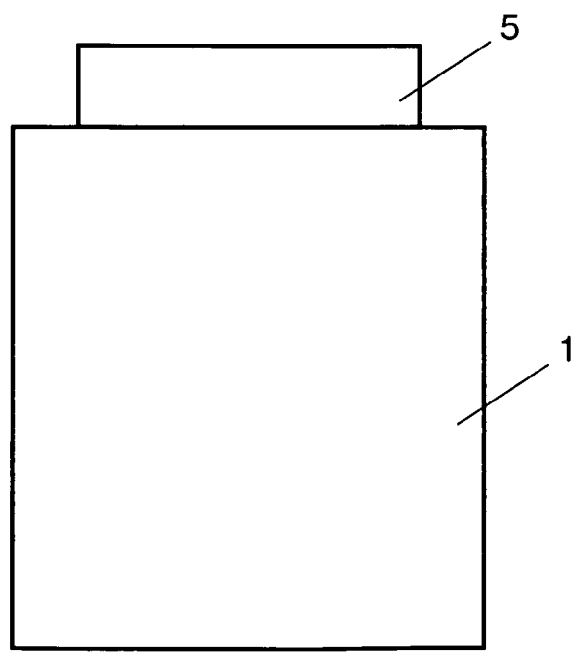
FIG. 2 is a front view of the same.
Figure 4:
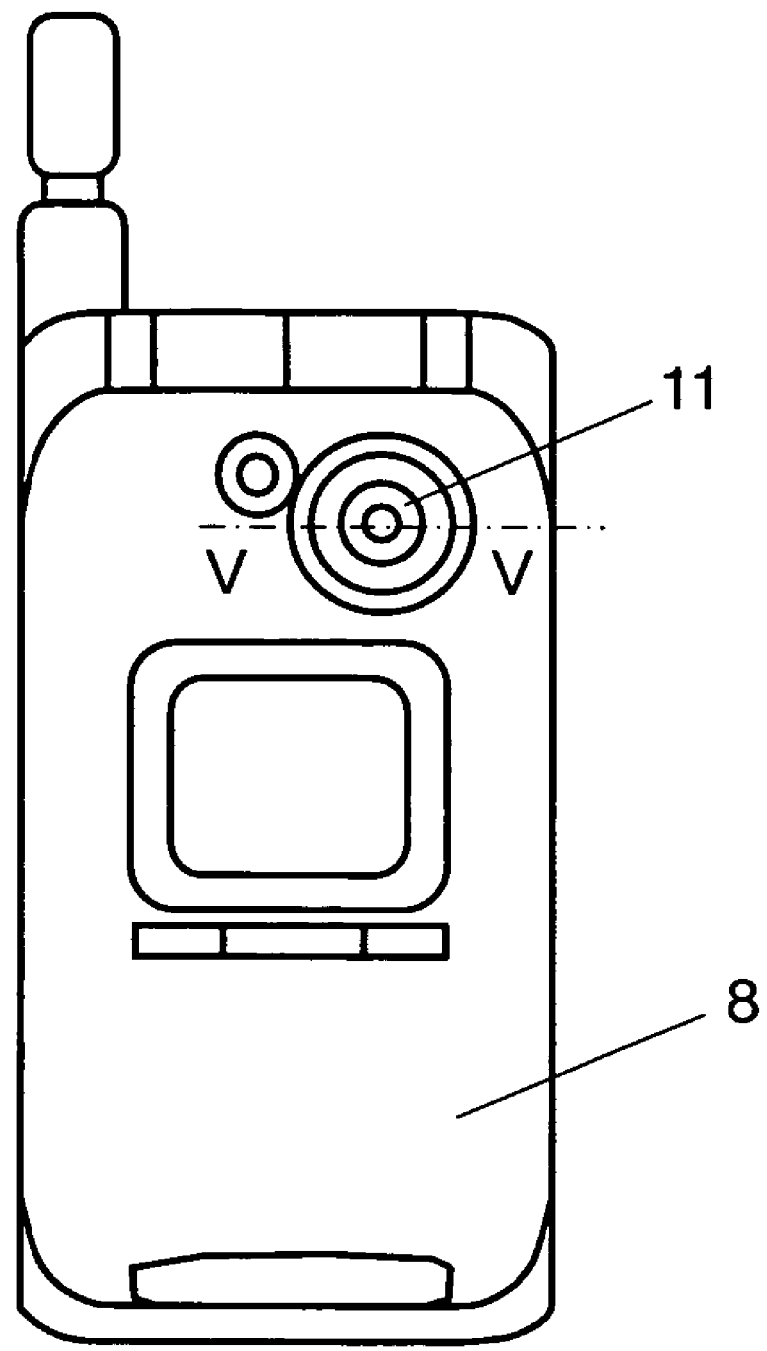
FIG. 4 is a front view of a portable telephone equipped with the lens unit of FIG. 3.
Figure 5:
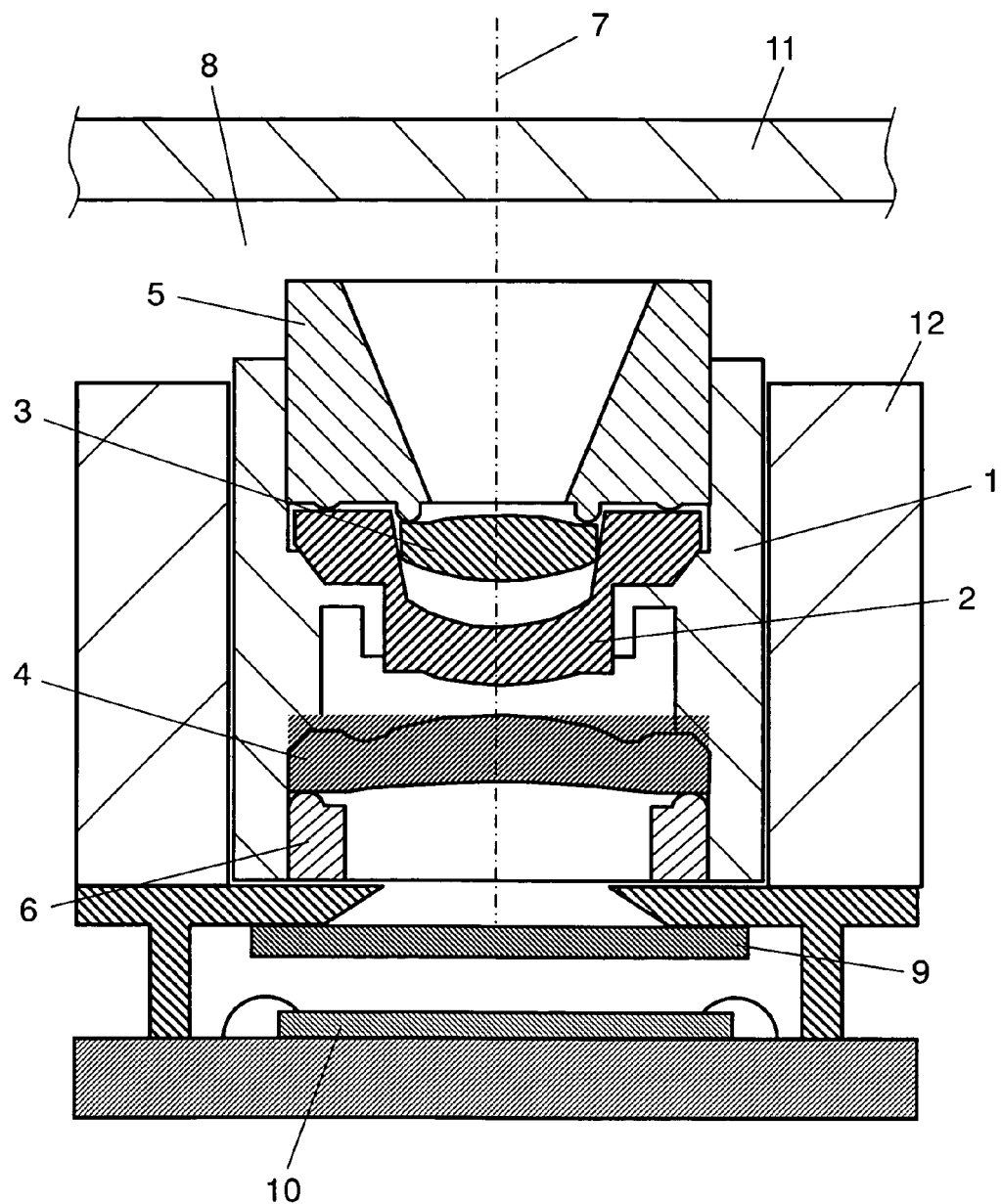
FIG. 5 is a sectional view along V-V line of FIG. 4.

And these lens units shown in FIG. 1 to FIG. 3 are mounted in main body case 8 of a portable telephone shown as an example of electronic apparatus as shown in FIG. 4 and FIG. 5.

In FIG. 5, since lens portion 2a of first lens 2 is opposed to image pickup element 10 in main body case 8, proper image forming can be realized by a lens unit with first lens 2, second lens 3 and third lens 4 integrated.

That is, in the present preferred embodiment, as shown in FIG. 4 and FIG. 5, the lens unit is housed in main body case 8, and the surface of throttle member 5 of the lens unit is not protruded from the surface of main body case 8.

In addition, since throttle member 5 of the lens unit is not protruded from main body case 8, it is possible to prevent excessive forces from being applied to throttle member 5 from outside main body case 8. Thus, first lens 2 can be prevented from being excessively pushed and damaged by throttle member 5.

Further, as shown in FIG. 5, since the surface of throttle member 5 of the lens unit is covered with transparent cover 11, application of excessive forces to throttle member 5 can be avoided outside the main body case 8, and therefore, it is possible to eliminate such trouble that first lens 2 is excessively pushed and damaged by throttle member 5.

In FIG. 5, same components and portions as those in FIG. 3 are given same reference numerals. Also the one shown in FIG. 5 comprises infrared ray cutting filter 9, image pickup element (charge coupled element) 10, transparent cover 11, and lens unit fixture 12.

INDUSTRIAL APPLICABILITY

As described above, the lens unit of the present invention is configured in that the first lens and the second lens are integrated in a holder together with a cylindrical holder. Accordingly, due to the combination of the first and second lenses at least, the lens aberration is improved, and the image pickup effect is enhanced in various electronic apparatuses.

The invention claimed is:

1. A lens unit comprising:
   a cylindrical holder;
   a first lens housed in said cylindrical holder, said first lens having a lens portion and a cylinder portion;
   a second lens housed in said cylindrical holder; and
   a throttle member having a pressing portion extending into said cylinder portion of said first lens so as to press said second lens into said cylinder portion of said first lens such that a radially outermost periphery of said second lens is disposed within said cylinder portion of said first lens and presses an inner periphery of said cylinder portion of said first lens radially outwardly.

2. The lens unit of claim 1, wherein an inner periphery of said cylinder portion of said first lens has a sloped portion, and wherein said first lens, said second lens, and said throttle member have a structure and are arranged such that said radially outermost periphery of said second lens contacts said sloped portion of said inner periphery of said cylinder portion of said first lens and presses said inner periphery of said cylinder portion of said first lens radially outwardly, said sloped portion of said inner periphery of said first lens being sloped relative to said radially outermost periphery of said second lens.

3. The lens unit of claim 1, wherein an inner periphery of said cylindrical holder is provided with a cylindrical holding portion disposed at a predetermined distance from said inner periphery of said cylindrical holder, and an outer periphery of said cylinder portion of said first lens is resiliently held by an inner periphery of said cylindrical holding portion.

4. The lens unit of claim 3, wherein said cylindrical holding portion is shaped so as to be resiliently biased radially inward, and said inner periphery of said cylindrical holding portion is smaller in diameter than that of said outer periphery of said cylinder portion of said first lens.

5. The lens unit of claim 4, wherein said cylindrical holder and said first lens are made of resin, and said cylindrical holding portion has a thickness less than that of said cylinder portion of said first lens.

6. The lens unit of claim 5, wherein said second lens is made of glass.

7. The lens unit of claim 6, wherein at least one of said inner periphery of said cylindrical holding portion and said outer periphery of said cylinder portion of said first lens is roughened.

8. The lens unit of claim 4, wherein said cylinder portion of said first lens has a hardness greater than that of said cylindrical holding portion.

9. The lens unit of claim 8, wherein at least one of said inner periphery of said cylindrical holding portion and said outer periphery of said cylinder portion of said first lens is roughened.

10. The lens unit of claim 9, wherein said second lens is made of glass, and said first lens is made of resin.

11. The lens unit of claim 8, wherein said second lens has a hardness greater than that of said first lens.

12. The lens unit of claim 4, wherein said inner periphery of said cylinder portion of said first lens is in tight contact with said radially outermost periphery of said second lens.

13. The lens unit of claim 12, further comprising:
   a flange extending between said inner periphery of said cylindrical holding portion and said cylindrical holder at one end of said cylindrical holding portion, wherein said flange, said cylindrical holder and said cylindrical holding portion are structured and arranged such that said lens portion of said first lens is disposed in said cylindrical holding portion and a collar of said first lens is abutted on said flange, said collar extending radially outward toward said inner periphery of said cylindrical holder at a portion outside of said cylindrical holding portion.

14. The lens unit of claim 13, wherein said collar of said first lens is pressed against said flange by said throttle member.

15. The lens unit of claim 14, wherein an abutment of said inner periphery of said cylinder portion of said first lens and said radially outermost periphery of said second lens is closer to said collar than an abutment of said flange and said collar.

16. The lens unit of claim 15, wherein said inner periphery of said cylinder portion of said first lens is sloped so as to decrease in diameter from said collar toward said lens portion.

17. The lens unit of claim 14, wherein a portion of said second lens in contact with said pressing portion of said throttle member is planar.

18. A lens unit comprising:
a cylindrical holder;
a first lens housed in said cylindrical holder, said first lens being made from resin and having a lens portion and a cylinder portion;
a second lens made of glass and housed in said cylindrical holder; and
a throttle member having a pressing portion extending into said cylinder portion of said first lens so as to press said second lens into said cylinder portion of said first lens such that a radially outermost periphery of said second lens is disposed within said cylinder portion of said first lens and presses an inner periphery of said cylinder portion of said first lens radially outwardly.

19. The lens unit of claim 18, wherein an inner periphery of said cylinder portion of said first lens has a sloped portion, and wherein said first lens, said second lens, and said throttle member have a structure and are arranged such that said radially outermost periphery of said second lens contacts said sloped portion of said inner periphery of said cylinder portion of said first lens and presses said inner periphery of said cylinder portion of said first lens radially outwardly, said sloped portion of said inner periphery of said first lens being sloped relative to said radially outermost periphery of said second lens.

20. The lens unit of claim 18, wherein an inner periphery of said cylindrical holder is provided with a cylindrical holding portion disposed at a predetermined distance from said inner periphery of said cylindrical holder, and an outer periphery of said cylinder portion of said first lens is resiliently held by an inner periphery of said cylindrical holding portion.

21. The lens unit of claim 20, wherein said cylindrical holding portion is shaped so as to be resiliently biased radially inward, and said inner periphery of said cylindrical holding portion is smaller in diameter than that of said outer periphery of said cylinder portion of said first lens.

22. The lens unit of claim 21, wherein said cylinder portion of said first lens has a hardness greater than that of said cylindrical holding portion.

23. The lens unit of claim 22, wherein said second lens has a hardness greater than that of said first lens.

24. The lens unit of claim 21, wherein said inner periphery of said cylinder portion of said first lens is in tight contact with said radially outermost periphery of said second lens.

25. The lens unit of claim 24, further comprising:
a flange extending between said inner periphery of said cylindrical holding portion and said cylindrical holder at one end of said cylindrical holding portion, wherein said flange, said cylindrical holder and said cylindrical holding portion are structured and arranged such that said lens portion of said first lens is disposed in said cylindrical holding portion and a collar of said first lens is abutted on said flange, said collar extending radially outward toward said inner periphery of said cylindrical holder at a portion outside of said cylindrical holding portion.

26. The lens unit of claim 25, wherein said collar of said first lens is pressed against said flange by said throttle member.

27. The lens unit of claim 26, wherein an abutment of said inner periphery of said cylinder portion of said first lens and said radially outermost periphery of said second lens is closer to said collar than an abutment of said flange and said collar.

28. The lens unit of claim 27, wherein said inner periphery of said cylinder portion of said first lens is sloped so as to decrease in diameter from said collar toward said lens portion.

29. The lens unit of claim 26, wherein a portion of said second lens in contact with said pressing portion of said throttle member is planar.

30. A lens unit comprising:
a cylindrical holder;
a cylindrical holding portion provided at an inner periphery of said cylindrical holder;
a first lens housed in said cylindrical holder, said first lens having a lens portion and a cylinder portion, said cylinder portion having a hardness greater than that of said cylindrical holding portion;
a second lens housed in said cylindrical holder; and
a throttle member having a pressing portion extending into said cylinder portion of said first lens so as to press said second lens into said cylinder portion of said first lens such that a radially outermost periphery of said second lens is disposed within said cylinder portion of said first lens and presses an inner periphery of said cylinder portion of said first lens radially outwardly.

31. The lens unit of claim 30, wherein an inner periphery of said cylinder portion of said first lens has a sloped portion, and wherein said first lens, said second lens, and said throttle member have a structure and are arranged such that said radially outermost periphery of said second lens contacts said sloped portion of said inner periphery of said cylinder portion of said first lens and presses said inner periphery of said cylinder portion of said first lens radially outwardly, said sloped portion of said inner periphery of said first lens being sloped relative to said radially outermost periphery of said second lens.

32. The lens unit of claim 30, wherein said cylindrical holding portion is disposed at a predetermined distance from said inner periphery of said cylindrical holder, and an outer periphery of said cylinder portion of said first lens is resiliently held by an inner periphery of said cylindrical holding portion.

33. The lens unit of claim 32, wherein said cylindrical holding portion is shaped so as to be resiliently biased radially inward, and said inner periphery of said cylindrical holding portion is smaller in diameter than that of said outer periphery of said cylinder portion of said first lens, and wherein said cylindrical holder and said first lens are made of resin, and said cylindrical holding portion has a thickness less than that of said cylinder portion of said first lens.

34. The lens unit of claim 33, wherein said second lens is made of glass.

35. The lens unit of claim 34, wherein at least one of said inner periphery of said cylindrical holding portion and said outer periphery of said cylinder portion of said first lens is roughened.

36. The lens unit of claim 32, wherein said cylindrical holding portion is shaped so as to be resiliently biased radially inward, and said inner periphery of said cylindrical holding portion is smaller in diameter than that of said outer periphery of said cylinder portion of said first lens, and wherein said inner periphery of said cylinder portion of said first lens is in tight contact with said radially outermost periphery of said second lens.

37. The lens unit of claim 36, further comprising:
a flange extending between said inner periphery of said cylindrical holding portion and said cylindrical holder at one end of said cylindrical holding portion, wherein said flange, said cylindrical holder and said cylindrical holding portion are structured and arranged such that said lens portion of said first lens is disposed in said cylindrical holding portion and a collar of said first lens is abutted on said flange, said collar extending radially outward toward said inner periphery of said cylindrical holder at a portion outside of said cylindrical holding portion.

38. The lens unit of claim 37, wherein said collar of said first lens is pressed against said flange by said throttle member.

39. The lens unit of claim 38, wherein an abutment of said inner periphery of said cylinder portion of said first lens and said radially outermost periphery of said second lens is closer to said collar than an abutment of said flange and said collar.

40. The lens unit of claim 39, wherein said inner periphery of said cylinder portion of said first lens is sloped so as to decrease in diameter from said collar toward said lens portion.

41. The lens unit of claim 38, wherein a portion of said second lens in contact with said pressing portion of said throttle member is planar.

\* \* \* \* \*